US010738927B2

(12) United States Patent
Tiberghien et al.

(10) Patent No.: US 10,738,927 B2
(45) Date of Patent: Aug. 11, 2020

(54) FEMALE ELEMENT FOR A FLUID COUPLING AND FLUID COUPLING INCLUDING SUCH AN ELEMENT

(71) Applicant: STAUBLI FAVERGES, Faverges (FR)

(72) Inventors: Alain-Christophe Tiberghien, Sevrier (FR); Christophe Durieux, Gilly sur Isere (FR)

(73) Assignee: STAUBLI FAVERGES, Faverges (FR)

( * ) Notice: Subject to any disclaimer, the term of this patent is extended or adjusted under 35 U.S.C. 154(b) by 212 days.

(21) Appl. No.: 15/447,362

(22) Filed: Mar. 2, 2017

(65) Prior Publication Data

US 2017/0261139 A1 Sep. 14, 2017

(30) Foreign Application Priority Data

Mar. 14, 2016 (FR) ...................................... 16 52114

(51) Int. Cl.
*F16L 37/23* (2006.01)
*F16L 21/03* (2006.01)

(52) U.S. Cl.
CPC ............... *F16L 37/23* (2013.01); *F16L 21/03* (2013.01)

(58) Field of Classification Search
CPC .................................. F16L 37/23; F16L 21/03
(Continued)

(56) References Cited

U.S. PATENT DOCUMENTS 2,854,259 A 9/1958 Clark
3,188,123 A 6/1965 Hansen
(Continued)

FOREIGN PATENT DOCUMENTS

GB 749794 A 5/1956
GB 749795 5/1956
(Continued)

OTHER PUBLICATIONS

French Search Report for FR 1652114 dated Nov. 8, 2016, 2 pages.
(Continued)

*Primary Examiner* — Zachary T Dragicevich

(57) ABSTRACT

This fluid coupling (R) element (200) comprises a body (202) for receiving a complementary end-piece (100), this body being centered on a longitudinal axis (X2) and defining a fluid circulation channel (204) within the body on the one hand, and a sealing chamber (208) in which a sealing gasket able to cooperate with the end-piece (100) inserted in the body (202) is housed, on the other hand. The sealing chamber is defined by an outer radial wall (2082) and a rear wall (2088). This coupling element comprises a locking mechanism (206) that includes locking members (2062) radially movable in the body relative to the longitudinal axis (X2), between a position blocking the end-piece (100) in the body and a position freeing a passage for the end-piece, and a locking ring (2066) mounted around the body and movable relative thereto, between a first position keeping the locking members (2062) in their blocking position and a second position in which the locking ring does not oppose the movement of the locking members toward their released position. The sealing chamber (208) is inwardly radially defined, relative to the longitudinal axis (X2), by an inner radial wall (2084), secured to the body (202), and by a front wall (2086). A front edge (2084b) of the inner radial wall (2084) is offset backward (d1), along the longitudinal axis (X2), relative to the rear surface (2086s) of the front wall (2086).

16 Claims, 9 Drawing Sheets

(58) Field of Classification Search
USPC .................................................. 285/308, 316
See application file for complete search history.

(56) References Cited

U.S. PATENT DOCUMENTS

| | | | | |
|---|---|---|---|---|
| 3,378,225 | A * | 4/1968 | Snyder, Jr. .............. | F16L 37/23 |
| 3,897,089 | A * | 7/1975 | Leichsenring .......... | F16L 37/23 |
| | | | | 285/316 X |
| 4,398,561 | A * | 8/1983 | Maldavs ................. | F16L 37/23 |
| 6,206,432 | B1 * | 3/2001 | Kamiyama ............. | F16L 37/23 |
| 6,237,631 | B1 * | 5/2001 | Giesler ................... | F16L 37/23 |
| 2009/0273183 | A1 | 11/2009 | Chambaud et al. | |
| 2015/0267851 | A1 * | 9/2015 | Aoki | |

FOREIGN PATENT DOCUMENTS

| | | |
|---|---|---|
| GB | 826599 | 1/1960 |
| GB | 826599 A | 1/1960 |
| GB | 1533080 | 11/1978 |
| GB | 1533080 A | 11/1978 |
| JP | 2011117582 A | 6/2011 |

OTHER PUBLICATIONS

International search report (France)—FR 1652114 dated Nov. 8, 2016.
European international search report—EP 17160476 dated Mar. 30, 2017.

* cited by examiner

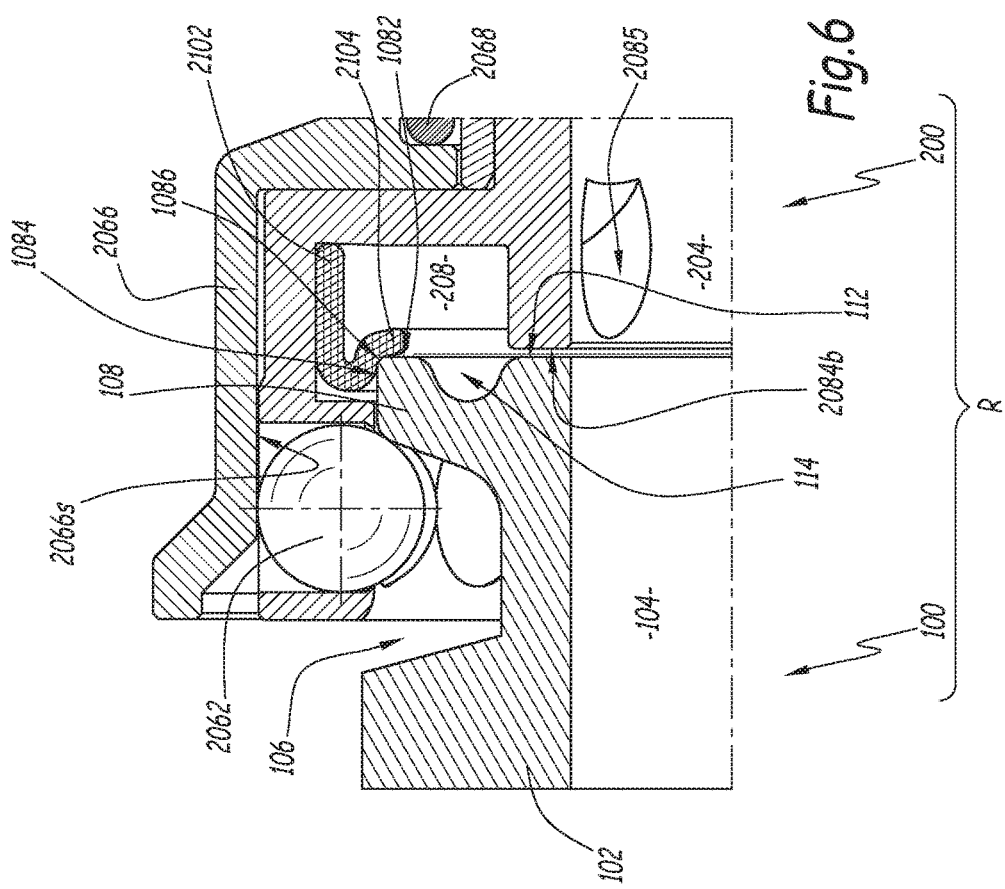
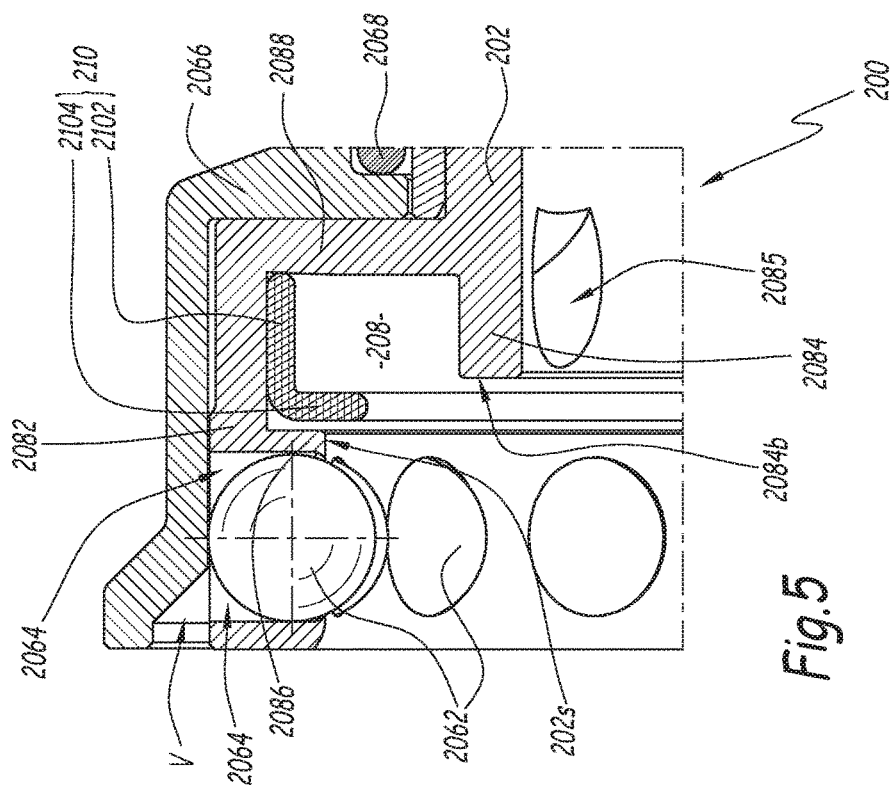

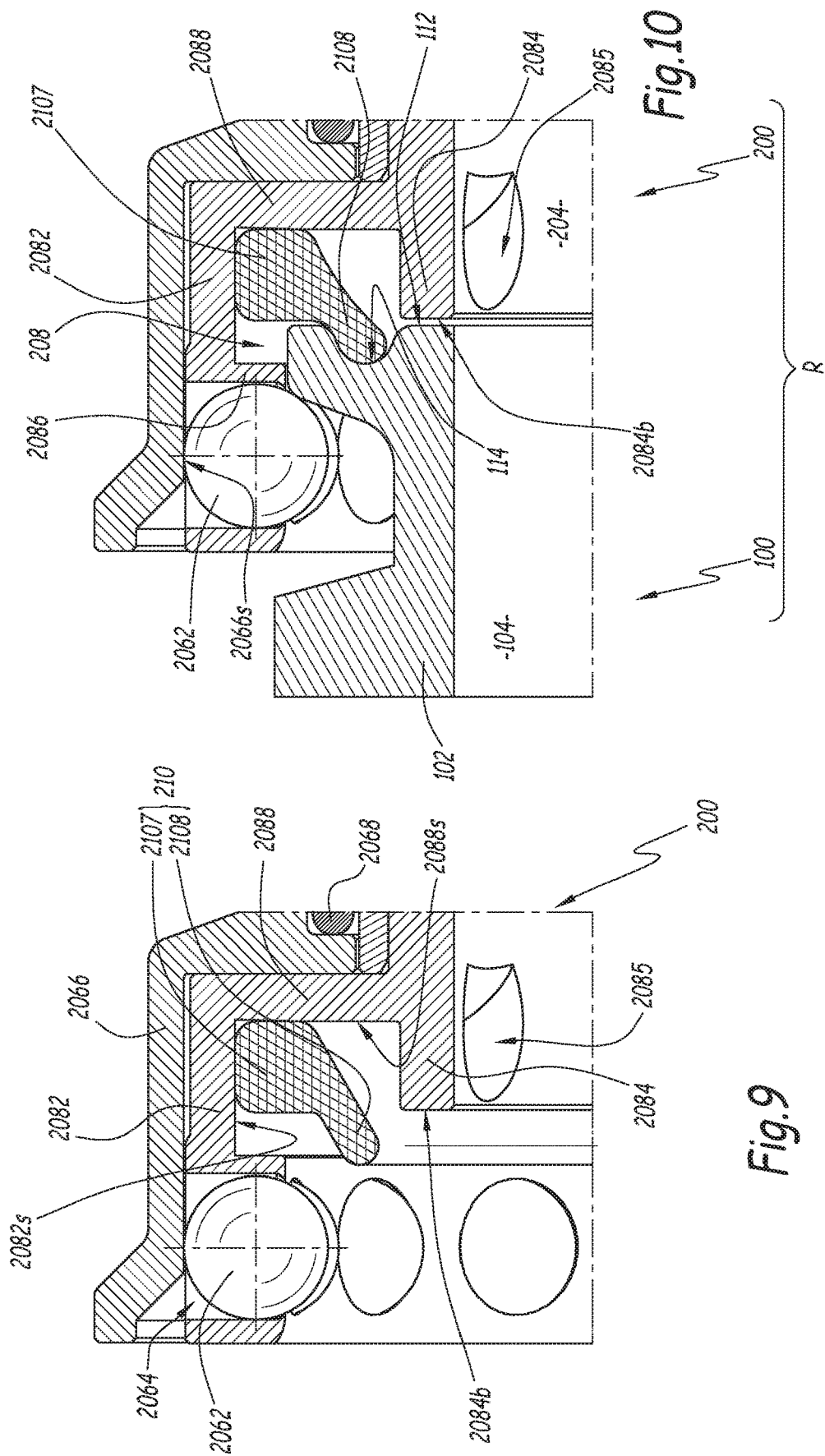

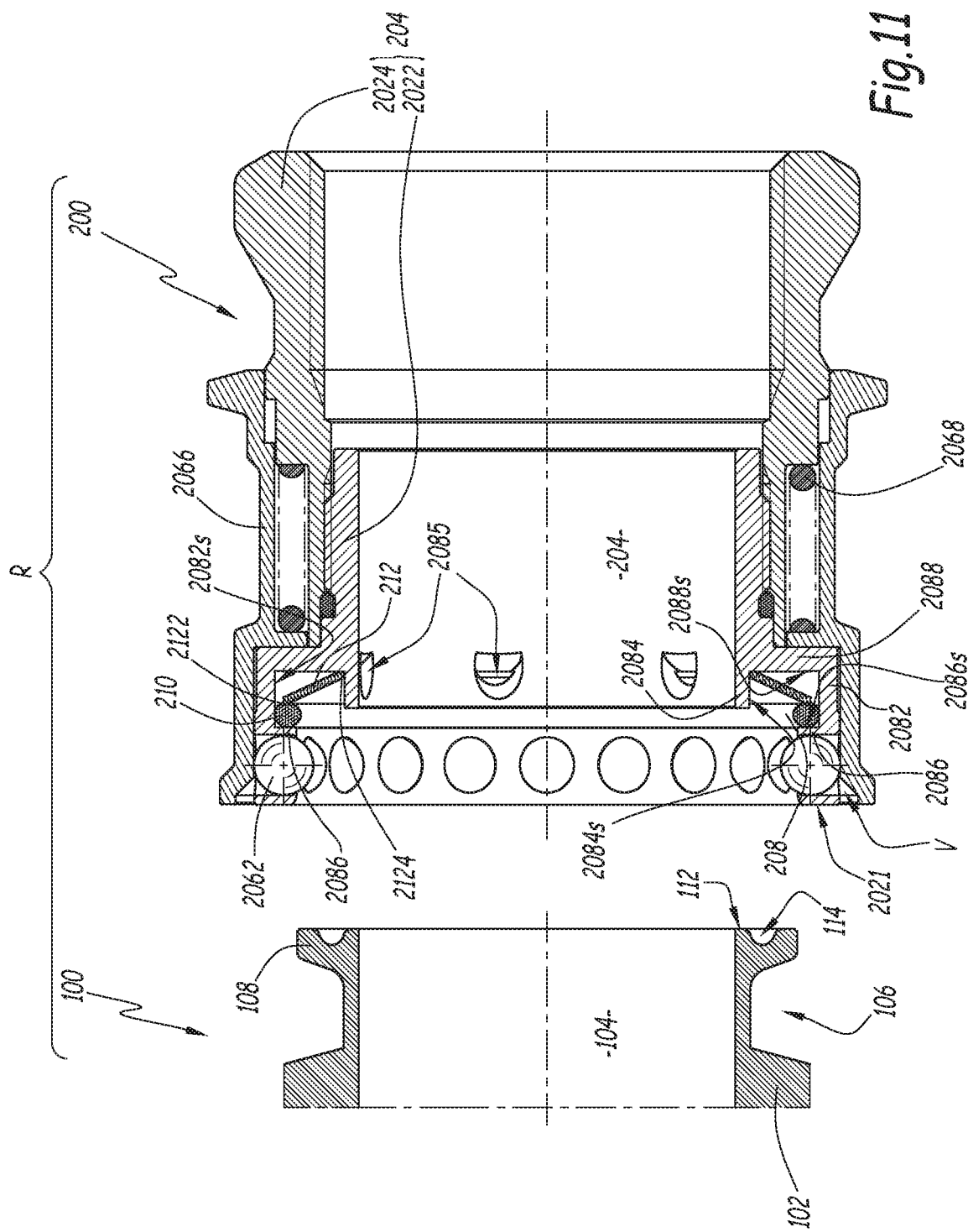

FEMALE ELEMENT FOR A FLUID COUPLING AND FLUID COUPLING INCLUDING SUCH AN ELEMENT

BACKGROUND OF THE INVENTION

The invention relates to a female element for a fluid coupling making it possible to form, with a complementary end-piece, a coupling making it possible to join fluid circulation pipes.

It is known to produce a fluid coupling using two end-pieces of the "clamp" type. These clamp end-pieces are coupled in pairs, inserting a sealing gasket between them that is housed in a frontal slot of each of these end-pieces, around a central fluid circulation channel arranged in each of these end-pieces. The two clamp end-pieces positioned on either side of the sealing gasket are kept in position and pressed against the seal using a collar placed around flanges respectively provided on each of the two clamp end-pieces, this collar being locked in the closed configuration. This type of connection makes it possible to react any play due to the machining allowances of the clamp end-pieces, while guaranteeing the sealing by crushing of the seal between the two end-pieces.

This type of assembly is relatively time-consuming to carry out, since it requires positioning the seal correctly with respect to the two frontal slots of the clamp end-pieces, then positioning and tightening the collar around their flanges, which must be done carefully, failing which the sealing of the connection may not be guaranteed. Yet for some applications, it would be advantageous to make the coupling of a clamp end-piece on a complementary element faster, while guaranteeing the sealing of the coupling thus formed.

It is known from U.S. Pat. No. 3,106,378 to use quick locking of an end-piece by a row of balls movable in the body of a coupling element and kept in inner radial position in a groove of the end-piece by a movable outer ring. This type of locking is particularly suitable for end-pieces having a groove with a geometry adapted to the balls and expensive outer surfaces made precisely, on either side of the groove, to guide the end-piece in the body of the coupling element, which is not the case for clamp-type end-pieces.

Another constraint that must be taken into account relates to the fact that a coupling element compatible with a clamp end-piece must be able to be cleaned easily, especially in the food field, and be placed with coupling forces of relatively modest intensity.

U.S. Pat. No. 3,188,123 also considers using a two-part body for a female coupling element, by jamming an O-ring between two parts of the body, axially across from an inner bush attached on the two-part body and intended to penetrate a male end-piece. A front wall of the inner bush is offset in the forward direction relative to the seal and the housing of the seal. The end-piece may collide with the inner bush during coupling, before coming into contact with the seal, which may damage the end-piece and reduce the sealing and lifetime of the seal.

The invention more particularly aims to resolve these issues and constraints by proposing a new fluid coupling element compatible with a clamp-type end-piece and making it possible to ensure a tight and lasting connection with such an end-piece.

BRIEF SUMMARY OF THE INVENTION

To that end, the invention relates to a coupling element to be coupled with a complementary end-piece to join two fluid pipes, this coupling element comprising a body for partially receiving a complementary end-piece, this body being centered on a longitudinal axis and defining a fluid circulation channel within the body on the one hand, and a sealing chamber that surrounds the channel and in which a sealing gasket able to cooperate with the complementary end-piece inserted in the body is housed, on the other hand, the sealing chamber being defined by an outer radial wall, a front wall, a rear wall, and, radially inward relative to the longitudinal axis, an inner radial wall secured to the body. This coupling element comprises a locking mechanism that on the one hand includes locking members radially movable in this body relative to the longitudinal axis, between a position blocking the complementary end-piece in the body and a position freeing a passage for the end-piece in the body, on the one hand, and a locking ring mounted around the body and movable relative thereto, between a first position keeping the locking members in their blocking position and a second position in which the locking ring does not oppose the movement of the locking members toward the released position, on the other hand. According to the invention, the front edge of the inner radial wall is offset backward, along the longitudinal axis, relative to the rear surface of the front wall.

Owing to the invention, the locking mechanism mounted on the body of the coupling element makes it possible to provide relative immobilization of the coupling element and the end-piece, without having to use a relatively complex collar. Furthermore, owing to the inner radial wall formed on the body of the coupling element, which inwardly defines the sealing chamber and against which the end-piece can abut in the coupled configuration, the pivoting of the end-piece in the coupling element is limited. Since the front edge of the inner radial wall is withdrawn, i.e., offset backward or toward the rear relative to the rear surface of the front wall, the complementary end-piece can come into contact with the seal during coupling before abutting against the inner radial wall, which guarantees maintained sealed contact between this end-piece and the sealing gasket received in the sealing chamber when, in the coupled configuration, the complementary end-piece pivots in the body of the coupling element until abutting against the inner radial wall. The sealing of the coupling in the coupled configuration is therefore effectively ensured. According to advantageous, but optional aspects of the invention, such a coupling element may incorporate one or more of the following features, considered in any technically allowable combination:

- The inner radial wall of the sealing chamber is provided with at least one opening for placing the sealing chamber in communication with the fluid circulation channel within the body.
- The outer, rear radial walls and inner radial wall form a single piece.
- The front wall forms a single piece with the outer, rear radial walls and inner radial wall.
- In the uncoupled configuration of the coupling element, the seal radially protrudes from the front wall, toward the longitudinal axis, at a portion of the longitudinal axis positioned in front of the front edge of the inner radial wall.
- The housings of the locking members in the body are arranged in the front wall and the locking members protrude radially from the front wall in their blocking position.
- The locking members are balls, and while the locking ring defines an inner radial covering surface of the balls in their blocking position when the locking ring is in its first position and a partial receiving space of the balls in the released position when the locking ring is in its second position, this partial receiving space in turn being outwardly defined, radially to the longitudinal axis, by a portion of the locking ring.

The sealing gasket comprises an outer base bearing against the outer radial wall and/or the rear wall of the sealing chamber and at least one blade which, in the uncoupled configuration of the coupling element, extends from the base and toward the longitudinal axis.

In the uncoupled configuration of the coupling element, the blade extends toward the longitudinal axis, from a front portion of the base and in a direction oriented toward the rear of the coupling element.

In the uncoupled configuration of the coupling element, an angle, defined between the blade and the base, is comprised between 65° and 80°.

In the uncoupled configuration of the coupling element, the sealing gasket is symmetrical relative to a plane radial to the longitudinal axis.

In the uncoupled configuration of the coupling element, the sealing gasket has, in a plane radial to the longitudinal axis, a globally U-shaped section open toward the longitudinal axis.

An elastic washer is positioned, bearing against the sealing gasket, in the sealing chamber. Preferably, this washer bears on the rear wall of the sealing chamber and pushes the sealing gasket back toward a front wall defining the sealing chamber.

According to a second aspect, the invention relates to a coupling that comprises a coupling element and a complementary end-piece. The complementary end-piece is provided with a central fluid passage channel, an outer radial cavity for receiving at least one locking member in the coupled configuration of the coupling, the receiving cavity being defined in front by a flange, a front face and a circumferential slot that borders the front face, which is positioned radially between the central channel and the circumferential slot. According to the invention, the coupling element is as stated above, whereas, in the coupled configuration of the coupling, the inner wall of the sealing chamber is aligned along the longitudinal axis of the coupling element with the front face of the complementary end-piece.

BRIEF DESCRIPTION OF THE SEVERAL VIEWS OF THE DRAWINGS

The invention will be better understood and other advantages thereof will appear more clearly in light of the following description of five embodiments of a coupling element and a coupler according to its principle, provided solely as an example and done in reference to the appended drawings, in which:

FIG. 5 is a detail view corresponding to detail V in FIG. 1, for a coupling and a coupling element according to a second embodiment of the invention, FIG. 6 is a detail view corresponding to detail VI in FIG. 4, for the coupling and the coupling element according to the second embodiment, FIGS. 9 and 10 are detail views similar to FIGS. 5 and 6, respectively, for a coupling and a coupling element according to a fourth embodiment of the invention, FIG. 11 is a sectional view similar to FIG. 1 for a coupling and a coupling element according to a fifth embodiment of the invention.

DETAILED DESCRIPTION OF THE INVENTION

Figure 1:
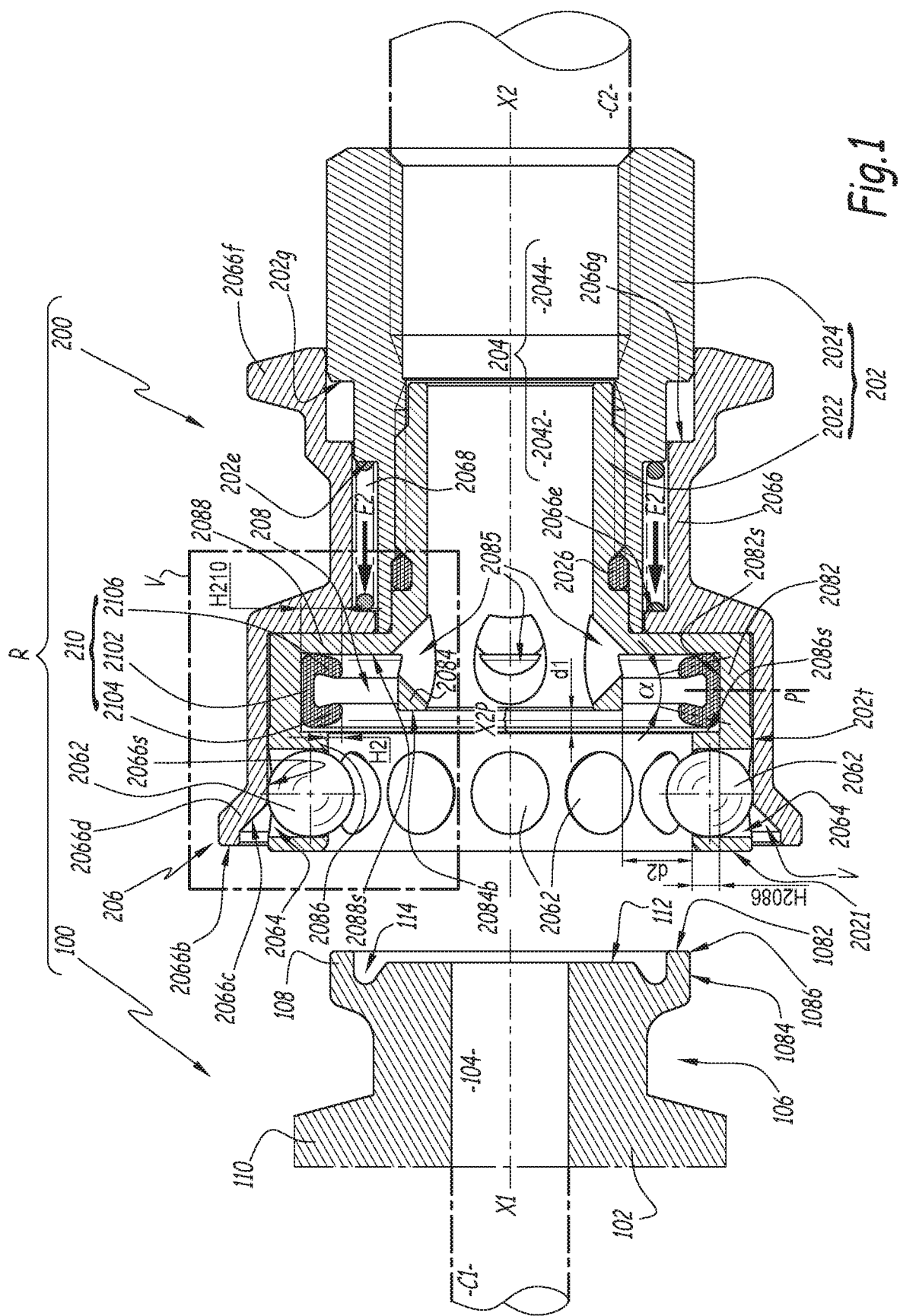
FIG. 1 is a longitudinal sectional diagram of the male and female elements of the fluid coupling according to the invention in the uncoupled configuration.

The fluid coupling R shown in FIGS. 1 to 4 comprises a female element 200 intended to be coupled with a male end-piece 100 complementary to said female element.

The male end-piece 100 is of the clamp end-piece type as defined by standards DIN-32676 or ASME BPE-2007 for an end-piece with an outer flange diameter equal to 25 mm. For an end-piece with an outer flange diameter equal to 34, 50 or 64 mm, this is defined by standards ISO 2852, DIN 32676, BS 4825-3 and/or ASME BPE-2007.

This male end-piece 100 comprises a single-piece body 102, preferably made from metal, that defines a central fluid circulation channel 104, this channel being connected, in a manner known in itself and on the rear of the body 102, to a fluid circulation pipe C1. For the clarity of the drawing, this pipe is shown in mixed lines in FIG. 1 only. The end-piece 100 is centered on a longitudinal axis X1 that constitute an axis of symmetry for the body 102. In particular, the channel 104 is cylindrical with a circular section centered on the axis X1. On its outer radial surface, the body 102 is provided with a peripheral groove 106 that constitutes an outer cavity for receiving a locking means. This locking means can be a wall of a collar, as known in the state of the art, or balls of the female element, as emerges from the following explanations. The groove 106 is defined, axially along the axis X1, toward the front by a flange 108 and toward the rear by a collar 110, this collar being optional as long as the body 102 can retain a reduced diameter of the bottom of the groove 106 going toward the rear of the male end-piece 100.

In this respect, the front side of an end-piece or element of the coupling R is defined as the side of this end-piece or element oriented in the fitting or coupling direction, i.e., oriented toward the complementary coupling element or end-piece during the fitting. Conversely, the rear side of an end-piece or element of the coupling R is defined as the direction opposite the complementary coupling element or end-piece. Thus, in the example of FIGS. 1 to 4, the front of the male end-piece 100 is situated to the right of this end-piece, while the front of the female element 200 is situated to the left of this end-piece.

Reference 1082 denotes the front edge of the flange 108, 1084 denotes its outer radial surface, and 1086 denotes a junction bevel between the edge 1082 and the surface 1084.

The male end-piece 100 is provided with a front face 112 that is arranged offset toward the rear, relative to the front edge 1082 of the flange 108. This front face is bordered, on the outside, by a circumferential slot 114 that is intended to receive part of a sealing gasket when this end-piece 100 is used traditionally, in cooperation with an end-piece of similar shape and with a collar. The front face 112 is positioned, radially with respect to the axis X1, between the central channel 104 and the circumferential slot 114. In practice, the front face 112 and the slot 114 are made in the form of a counterbore from the front of the male end-piece 100.

The female element 200 is centered on a longitudinal axis X2 and comprises a body 202 intended to receive a front portion of the male end-piece 100 in the coupled configuration of the coupling R. The body 202 is formed by a single-piece front part 2022 and a single-piece rear part 2024 screwed on the front part, with an O-ring seal 2026 inserted. The parts 2022 and 2024 are made from metal, preferably steel.

The body 202 defines a central fluid passage channel 204. This central channel 204 is formed by two unitary central channels 2042 and 2044 respectively arranged at the center of a rear portion of the front part 2022 and the center of the rear part 2024 of the body 202. This channel 204 is connected, on the rear of the body 202, to a fluid circulation pipe C2 that is shown in mixed lines in FIG. 1 only, for clarity of the drawing.

A locking mechanism 206 is provided on the female element 200 and comprises a row of balls 2062 positioned in radial through orifices 2064 arranged in the body 202, near its front edge 2021. The orifices 2064 are through orifices in the sense that they emerge both on an inner radial surface 202s and an outer radial surface 202t of the body 202. The outlet of each orifice 2064 on the inner radial surface 202s of the body 202 has a diameter smaller than that of the balls 2062, which makes it possible to limit a centripetal movement of the balls 2062 toward the axis X2. The mechanism 206 also comprises a locking ring 2066, which is mounted sliding around the body 202, as well as a spring 2068 that exerts an axial elastic force E2 oriented toward the front of the female element 200 on this ring. The spring 2068 is a spiral compression spring positioned radially between the body 202 and the ring 2066, bearing against an outer shoulder 202e of the body 202 and against an inner shoulder 2066e of the locking ring 2066.

On the side of its front edge 2021, the body 202 has an outer diameter larger than its part around which the spring 2068 is mounted. Reference 2066s denotes the inner radial surface of the ring 2066 that surrounds the front part of the body 202 with a larger diameter. This surface 2066s has a diameter substantially equal to the outer diameter of the outer radial surface 202t of the front part of the body 202, such that, when this surface 2066s is across from the balls 2062 along the axis X2, it forces these balls to protrude radially inward, relative to the inner radial surface 202s of the body 202, through the respective outlet of the orifices 2064. This in particular corresponds to the configuration shown in FIG. 1.

Near its front edge 2066b, the ring 2066 is provided with a divergent portion 2066d, the inner surface of which defines a bevel 2066c converging toward the longitudinal axis X2 as it moves away from the front edge 2066b. A hollow space V is thus formed between the bevel 2066c and the outer radial surface 202t of the body 202 at the orifices 2064.

Furthermore, the locking ring 2066 is provided with an outer peripheral collar 2066f on which an operator can exert an axial force E4 parallel to the axis X2 and oriented toward the rear, greater than the force E2, in order to bring the space V across from the balls 2062 when necessary, as explained below.

The element 200 also defines a sealing chamber 208 in which an elastomer sealing gasket 210 is positioned.

The sealing chamber radially surrounds the unitary channel 2042 arranged in the front part 2022 of the body 202. This sealing chamber is defined, radially to the axis X2, between an outer radial wall 2082 and an inner radial wall 2084 that is provided with four openings 2085 placing the channel 204 in communication with the sealing chamber 208. Along the longitudinal axis X2, the sealing chamber 208 is defined between a front wall 2086 and a rear wall 2088 that connects the two parts of the body 202 with different diameters mentioned above. The walls 2082, 2084, 2086 and 2088 form a single piece. These are portions of the front part 2022 of the body 202. Thus, the wall 2084 is secured to the body 202, inasmuch as it is stationary relative to this body in the uncoupled configuration and during coupling. The inner radial wall 2084 defines the front portion of the channel 2042 and is radially positioned between the longitudinal axis X2 and the sealing chamber 208.

The walls 2082, 2084, 2086 and 2088 respectively define inner radial 2082s, outer radial 2084s, rear axial 2086s and front axial 2088s surfaces turned toward the sealing chamber 208 and that form contours of the sealing chamber 208.

The sealing chamber 208 is positioned behind the housings 2064, and the housings 2064 are arranged in the front wall 2086.

The sealing chamber 208 forms an annular space around the axis X2 within the body 202.

Under the force E2 of the spring 2068, in the uncoupled configuration, the locking ring 2066 bears against the outer surface 2088t of the wall 2088 that is opposite the sealing chamber 208. The outer radial wall 2082 constitutes the bottom of the sealing chamber 208. The rear axial surface 2086s of the front wall 2086 extends radially, from the outer radial wall 2082 and toward the longitudinal axis X2, over a radial height smaller than the radial dimension of the front surface 2088s of the rear wall 2088. In other words, the sealing chamber 208 is closed on the rear side of the female element 200, but partially open toward the front edge 2021. More specifically, the sealing chamber 208 is open along the longitudinal axis X2 toward the mouth of the coupling element 200.

Reference 2084b denotes the front edge of the inner radial wall 2084 that is oriented toward the front of the female element 200. This front edge is intended to bear against the front face 112 of the male end-piece during fitting of the elements 100 and 200 in one another, and optionally, in the coupled configuration of the coupling R. The front edge 2084b is a surface perpendicular to the axis X2. The inner radial surface 2082s of the outer radial wall 2082 extends, between the rear wall 2088 and the front wall 2086, over an axial length L2082 greater than the axial length L2084 of the inner radial wall 2084. More specifically, the axial length L2084 of the inner radial wall 2084, defined from the rear wall 2088 to the front edge 2084b of the inner radial wall 2084, is comprised between 50% and 90%, preferably about 75%, of the axial length L2082 of the inner radial surface 2082s. In other words, the sealing chamber 208 is closed on the outer side of the female element 200, but partially radially open toward the inside toward the longitudinal axis X2.

The front edge 2084b of the inner radial wall 2084 is offset backward, along the longitudinal axis X2, relative to the rear axial surface 2086s. In other words, an axial distance d1, measured parallel to the axis X2, between the rear axial surface 2086s and the front edge 2084b, is non-zero and the rear axial surface 2086s is positioned further forward than the front edge 2084b along the axis X2.

The sealing gasket 210 has a geometry of revolution around an axis combined with the axis X2 in the configuration with the seal 210 mounted in the sealing chamber 208. In the plane of FIGS. 1 to 4, which is a plane radial to the axis X2, the section of the seal 210 is globally U-shaped, open toward the longitudinal axis X2. The seal 210 comprises an annular outer base 2102 and two branches respectively formed by a front blade 2104 and a rear blade 2106. The base 2102 comprises a planar outer surface able to come into contact with the inner radial surface 2082s and a rear surface able to come into contact with the front surface 2088s. In practice, in the uncoupled configuration, when there is no contact with the end-piece 100, the sealing gasket 210 is symmetrical relative to a plane P perpendicular to the axis X2 and passing through the center of the base 2102. FIG. 1 shows that in the uncoupled configuration of the coupling, the front blade 2104 extends from the front portion of the base 2102 both toward the longitudinal axis X2 and in a direction oriented toward the rear of the female element 200, while the rear blade 2106 extends from the rear portion of the base 2102 both toward the longitudinal axis X2 and in a direction oriented toward the front of the female element 200. Furthermore, the root of the front blade 2104, i.e., its junction zone with the base 2102, is positioned, along the axis X2, globally across from a portion X2P of the axis X2 situated between the rear axial surface 2086s and the front edge 2084b, i.e., between the front wall 2086 and the front end of the inner radial wall 2084. Moreover, the front blade 2104 radially protrudes from the front wall 2086, toward the longitudinal axis, at a portion of the longitudinal axis X2 positioned in front of the front edge 2084b. The blades 2104 and 2106 converge toward the plane P as they move away from the base 2102. Reference a denotes the convergence angle of the blades 2104 and 2106 toward one another. The value of this angle α is chosen between 20° and 50°, preferably about 30°. In the radial cutting plane of FIGS. 1 to 4, each of the blades 2104 and 2106 forms a curved finger tilted toward the plane P that is perpendicular to the base 2102. In particular, the front blade 2104 forms, with the base 2102, an acute angle ß whose value is comprised between 65° and 80°, preferably about 75°.

The dimensions of the sealing gasket 210 are defined based on those of the sealing chamber 208, such that, when it is in place in the sealing chamber 208, the sealing gasket 210 bears by its base 2102 against the outer radial wall 2082 that constitutes the bottom of the sealing chamber 208. In the uncoupled configuration shown in FIG. 1, the front blade 2104 protrudes radially, toward the longitudinal axis X2, relative to the front wall 2086, over a radial height H2 [that] corresponds to about half of the radial height H2086 of the rear axial surface 2086s. Thus, the front blade 2104 of the sealing gasket 210 is accessible for the end-piece 100 from the mouth of the female element 200. In practice, the ratio H2/H2086 can be chosen between 30% and 70%, preferably between 40% and 60%.

Reference d2 denotes the radial distance between the inner radial edge of the front wall 2086, corresponding to the surface 202s, and the outer radial surface 2084s of the wall 2084. This distance d2 is greater than the radial height H210 of the seal 210, which makes it possible to insert the sealing gasket 210 into the sealing chamber 208 through the front of the female element 200. The radial opening between the walls 2084 and 2086, with radial height d2, also allows easy removal of the sealing gasket 210, in particular for a complete cleaning operation of the female element 200.

To fit the elements 100 and 200 in one another, the axes X1 and X2 are aligned and then together define a central axis XR of the coupling R. The operator moves the ring 2066 back against the elastic force E2 exerted by the spring 2068 by exerting a force E4 on the collar 2066f oriented toward the rear of the female element 200. This force E4 is maintained until the locking ring 2066 bears by a shoulder 2066g against a corresponding outer shoulder 202g arranged on the body 202, more specifically on its rear part 2024. One then reaches the configuration of FIG. 2, where the space V is axially, along the axis XR, across from a portion of the balls 2062.

Under these conditions, it is possible to insert the male end-piece 100 into the mouth of the female element 200 defined by the inner radial surface 202s. Upon this insertion, the flange 108 radially pushes the balls 2062 back outward, within the orifices 2064, which is possible because the surface 2066s no longer opposes the centrifugal radial movement of the balls 2062. The balls 2062 thus reach a second position different from the first position shown in FIG. 1 and in which they are partially received in the space V and free a passage for the end-piece 100 in the body 202. The insertion movement of the male end-piece 100 and the female element 200 is continued, in the direction of arrow F2, until reaching the configuration of FIG. 3, where the front face 112 of the male element 100 abuts against the front edge 2084b of the inner radial wall 2084. In this position, the peripheral groove 106 of the male end-piece 100 is axially across from the balls 2062.

When the operator releases his force E4 on the collar 2066f, the locking ring 2066 is pushed back toward the front of the female element 200 by the force E2 of the spring 2068, which results in axially realigning the surface 2066s with the balls 2062. The converging nature of the bevel 2066c toward the axis XR and toward the rear of the female element 200 facilitates the centripetal movement of the balls 2062 because this bevel works as a ramp returning balls 2062 toward the axis XR. At the end of the forward movement of the locking ring 2066 under the action of the spring 2068, by abutment against the outer surface 2088t, the surface 2066s radially surrounds the locking balls 2062 and keeps them in their first position, where they protrude toward the axis XR relative to the surface 202s. The balls 2062 are thus kept engaged in the groove 106, which results in blocking the male end-piece 100 in the body 202 of the female element 200. In this configuration shown in FIG. 3, the male end-piece 100 is blocked in the body 200, in the sense that it cannot be removed from this body, using a movement separating the elements 100 and 200 along the axis XR, even though a relative rotational movement around the axis XR remains possible between the end-piece 100 and the female element 200.

Figure 2:
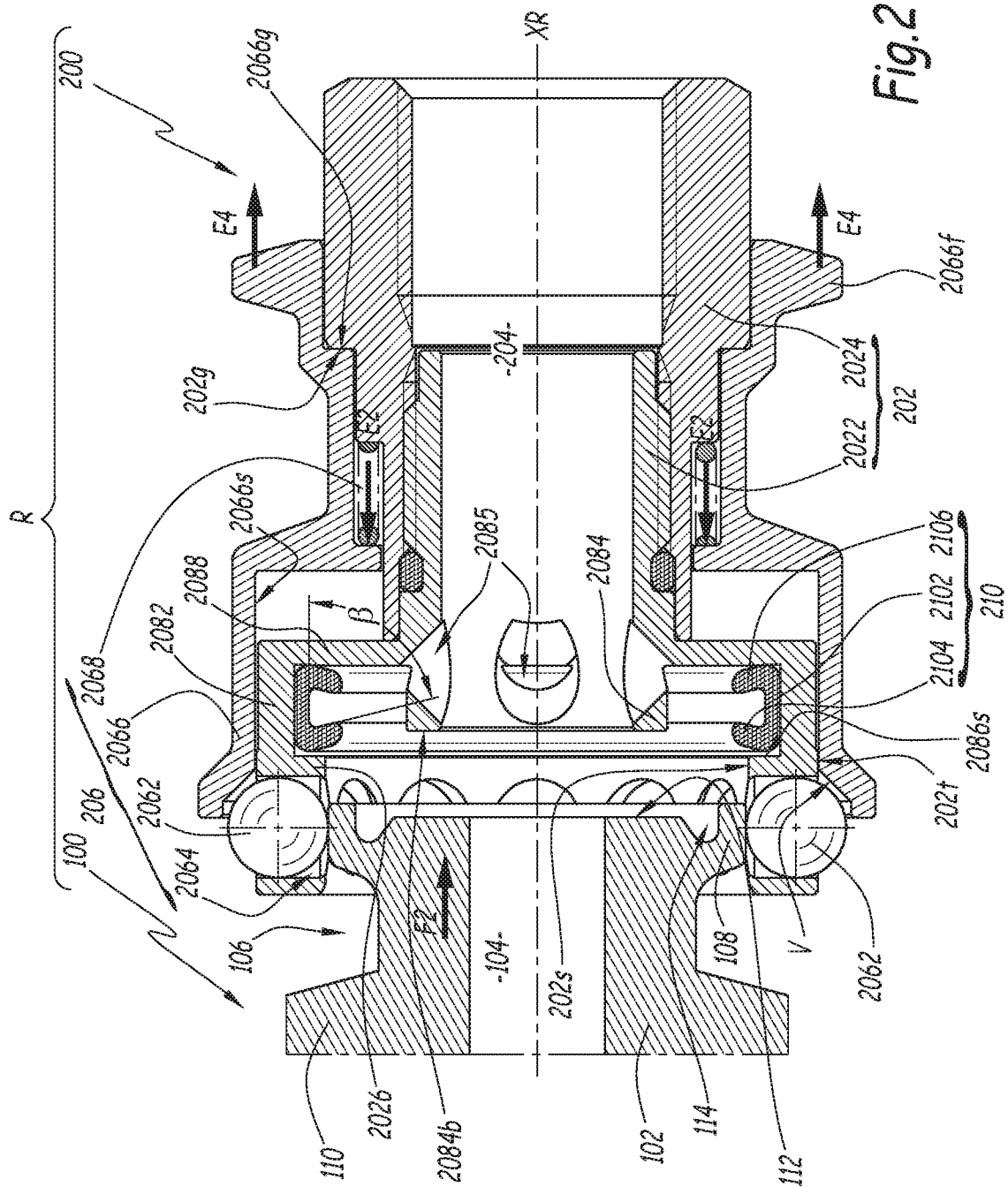
FIG. 2 is a sectional view similar to FIG. 1, during a first fitting step of the coupling elements.
Figure 3:
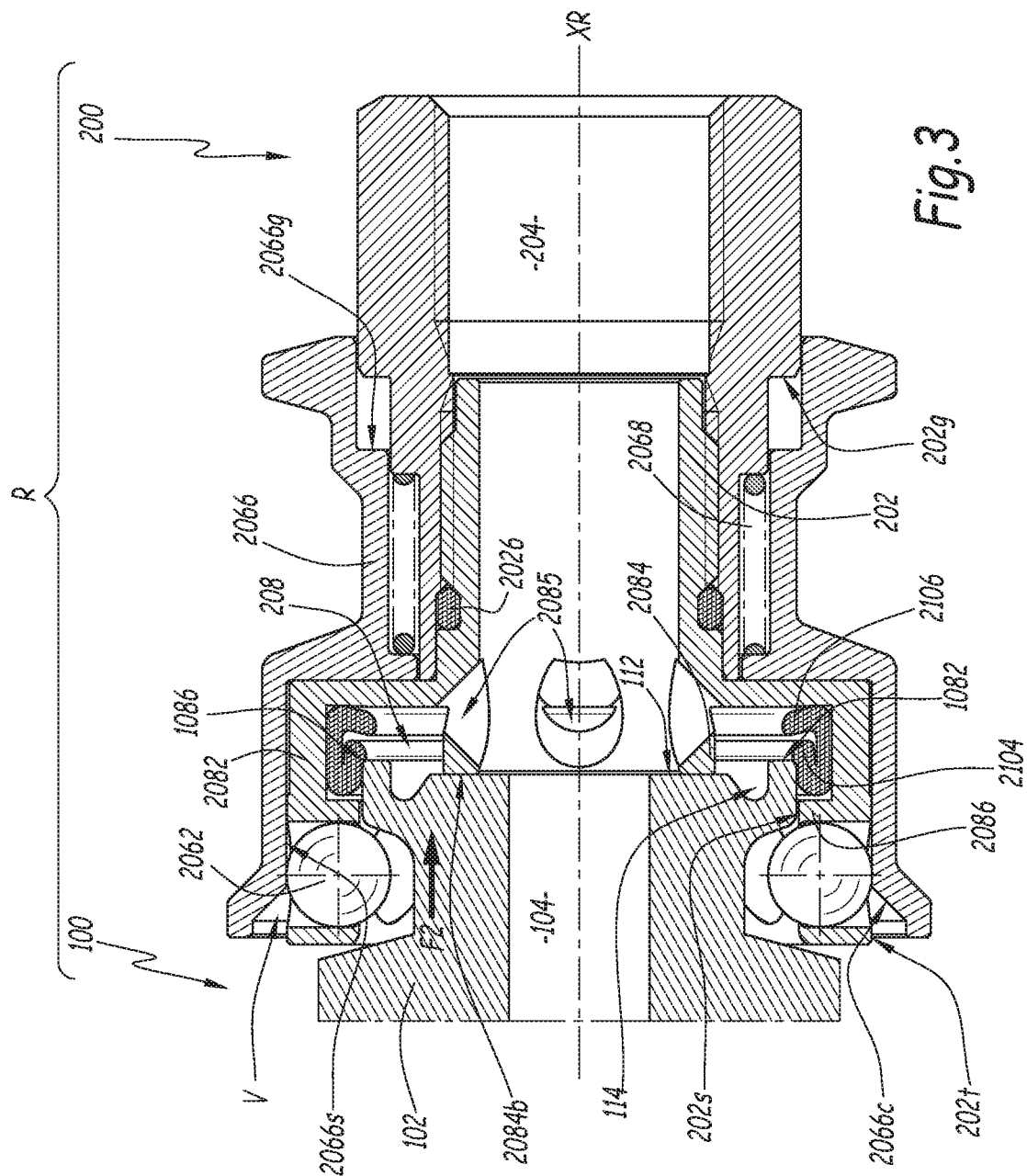
FIG. 3 is a sectional view similar to FIG. 2, during a second fitting step.
Figure 4:
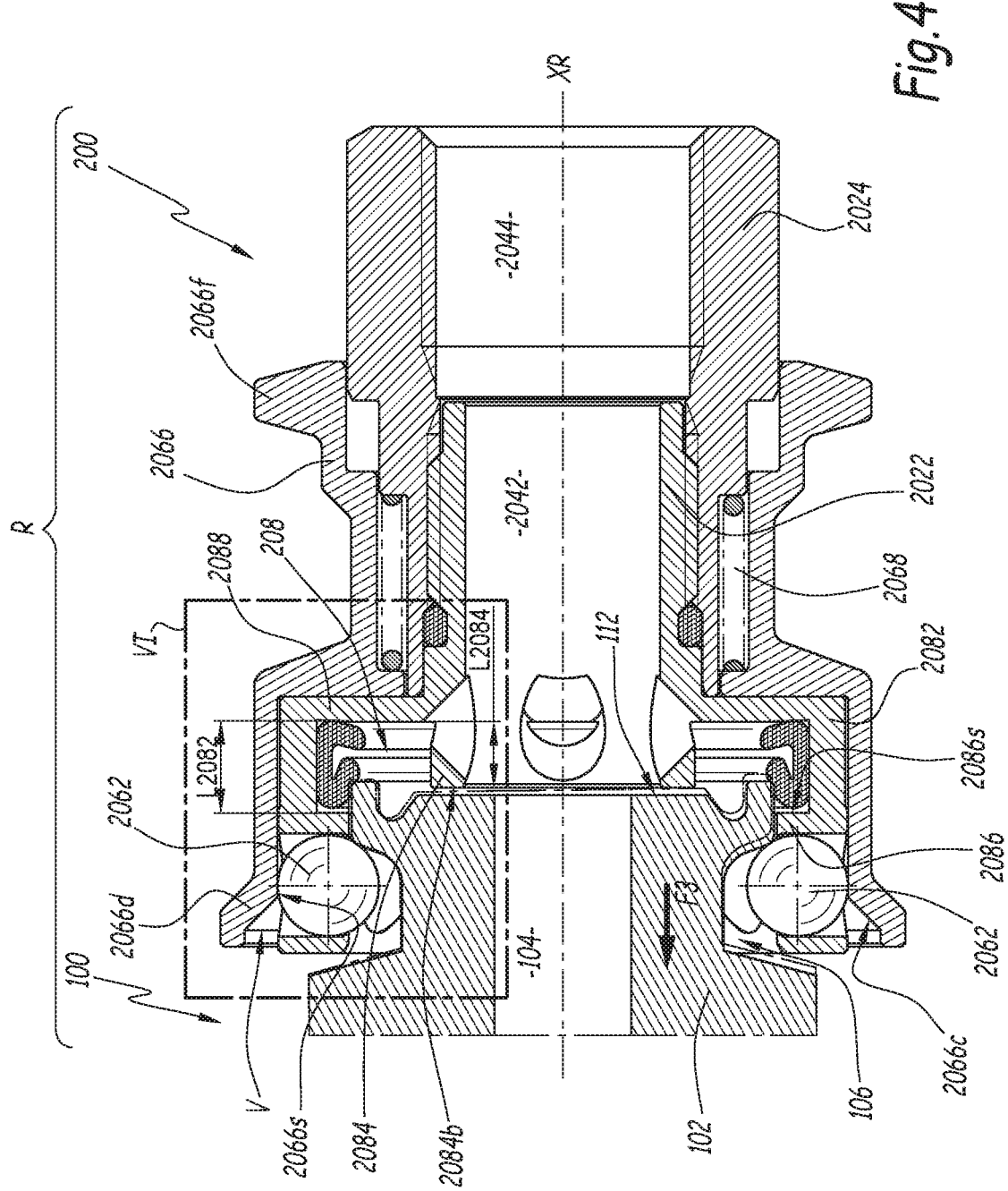
FIG. 4 is a sectional view similar to FIGS. 1 to 3 when the coupling is in the coupled configuration.

In other words, the balls 2062 are radially movable relative to the axis XR, within the orifices 2064 arranged in the body 202, between the first blocking position shown in FIGS. 1, 3 and 4 where they protrude radially toward the axis XR of the front wall 2086, from the surface 202s, and block the passage for the end-piece 100 in the body 202 when it is engaged in this body, and the second released position, shown in FIG. 2, where they free the passage for the end-piece 100 in the body 202, during the coupling or uncoupling of the end-piece 100 and the female element 200.

The locking ring 2066 is movable along the axis XR and around the body 202 between a first maintaining position shown in FIGS. 1, 3 and 4, where its inner radial surface 2066s blocks the balls 2062 in their first blocking position, and a second position, offset toward the rear relative to the first maintaining position, which is shown in FIG. 2 and in which the surface 2066 is axially offset relative to the balls 2062 toward the rear and the space V is aligned with these balls, which allows the balls to move toward their second released position under the action of the flange 108.

When the male end-piece 100 goes from the position of FIG. 2 to that of FIG. 3, the front edge 1082 of the flange 108 comes into contact with the front blade 2104 of the sealing gasket 210, which protrudes from the wall 2086 as explained above. More specifically, when the male end-piece 100 progresses in contact with the seal 210, the blade 2104 of the seal 210 marries the geometry of the body 102 near the bevel 1086. Furthermore, due to the insertion of the male end-piece 100 into the female element 200, the flange 108 exerts, on the seal 210, an axial force oriented toward the rear wall 2088, which results in pressing the seal 210 against this rear wall. This ensures the sealing between the channels 104 and 204 on the one hand, and the outside of the coupling R on the other hand.

Thus, the seal 210 is both translated toward the rear of the female element 200, if it was not already in contact with the surface 2088s of the rear wall 2088 before the coupling, and bent, at the front blade 2104.

Based on the geometry of the end-piece, which may vary in light of the machining allowances of the body 102, the seal 210 is bent more or less during the insertion of the end-piece 100 into the female element 200. In all cases, contact is ensured between the flange 108 and the front blade 2104 of the seal 210, and between the seal 210 and the body 202, which ensures the sealing.

In the coupled configuration shown in FIG. 4, the fluid can circulate from the channel 104 toward the channel 204, or in the opposite direction, and the pressure of the fluid within these channels also prevails in the sealing chamber 208, since the latter communicates with the channel 204 through the openings 2085. The pressure of the fluid in the chamber 208 is exerted on the front face 112 and results in pushing the end-piece back in the direction of arrow F3 in FIG. 4, i.e., along an axial direction separating the front face 112 relative to the front edge 2084b. The withdrawal movement of the male end-piece 100 under the effect of this pressure brings the flange 108 into contact with balls 2062 kept in their first blocking position by the locking ring 2066, while the sealing continues to be ensured by the tight contact between the flange 108 and the seal 210 and between the seal 210 and the body 202. Furthermore, the pressure of the fluid prevailing in the sealing chamber 208 results in firmly pressing the front blade 2104 against the flange 108, as well as pressing the base 2102 against the wall 2082. The obtained sealing is thus improved by the pressure of the fluid passing through the coupling R.

When the balls 2062 engage in the groove 106 and are kept therein by the locking ring 2066, i.e., in the configuration of FIG. 3 and the coupled configuration of FIG. 4, the front face 112, positioned radially to the axis X2 between the channel 104 and the circumferential slot 114, is aligned along the longitudinal axis X2 with the inner radial wall 2084.

In the coupled configuration, and based on the exact geometry of the body 102, the end-piece 100 can pivot around an axis perpendicular to the plane of FIG. 4, as shown by the outline of the body in mixed lines in this figure. The pivoting of the body 102 is limited by the front edge 2084b of the inner radial wall 2084 against which the front face 112 abuts, without risk of breaking the sealing between the flange 108 and the seal 210. Indeed, the amplitude of the pivoting movement allowed for the end-piece between the balls 2062 and the inner radial wall 2084 is small relative to the elastic bending of the front blade 2104, such that the front blade 2104 remains bearing against the flange 108, irrespective of the relative position of the front face 112 and the front edge 2084b when the coupling is in the coupled configuration. Furthermore, the front wall 2086, which is positioned around the flange 108 in the coupled configuration, contributes to limiting the pivoting of the end-piece 100 in the female element 200.

When the end-piece 100 needs to be uncoupled or separated from the female element 200, after cutting off the passage of the fluid in the coupling R, the operator once again exerts the axial force E4 on the ring 2066, which results in retracting the ring 2066 toward the rear of the body 202. By keeping the ring 2066 in its second position retracted toward the rear, abutting against the outer shoulder 202g of the body 202, the operator can pull on the male end-piece 100, in the direction of arrow F3, which allows him to remove the end-piece 100 from the body 202. This removal is made possible by the fact that the locking ring 2066 frees the balls 2062, which can radially move away from the axis XR while penetrating the space V when they are chased from the peripheral groove 106 by the flange 108. This causes the balls 2062 to leave the passage free for the end-piece 100 inside the body 202.

When the end-piece 100 has thus been removed from the female element 200, the operator releases the locking ring 2066, which is returned in the forward direction by the spring 2068 abutting against the body 202. The female element 200 is then once again in the configuration of FIG. 1, where it is ready for a new connection.

In the second to fifth embodiments shown in FIG. 5 and following, the elements similar to those of the first embodiment bear the same references. Hereinafter, we primarily describe the differences between these embodiments and the first embodiment. In particular, in the second to fifth embodiment, the front face 112 is not offset toward the rear relative to the front edge 1082 of the flange 108, but at the same longitudinal level along the longitudinal axis X1. The front edge 2084b, however, remains offset toward the rear from the rear axial surface 2086s along the longitudinal axis X2 and the seal 210 of the second to fifth embodiments radially protrudes, toward the longitudinal axis X2, from the front wall 2086 at a portion of the longitudinal axis X2 positioned in front of the front edge 2084b.

FIGS. 5 and 6 are sectional views in an offset radial plane of the openings 2085 provided in the inner radial wall 2084, whereas in FIGS. 1 to 4, the cutting plane intersects these openings. The cutting planes of FIGS. 7 to 12 are the same as those of FIGS. 5 and 6.

In the embodiment of FIGS. 5 and 6, the seal 210 has an L-shaped section, and comprises an annular outer base 2102 and a front blade 2104 connected to the front portion of the base 2102, but no rear blade similar to the rear blade 2106 of the first embodiment. In this embodiment, the sealing gasket 210 bears against the rear wall 2088 of the sealing chamber 208 by its base 2102. In the coupled configuration, the flange 108 bears against the seal 210 and deforms the front blade 2104.

Figure 8:
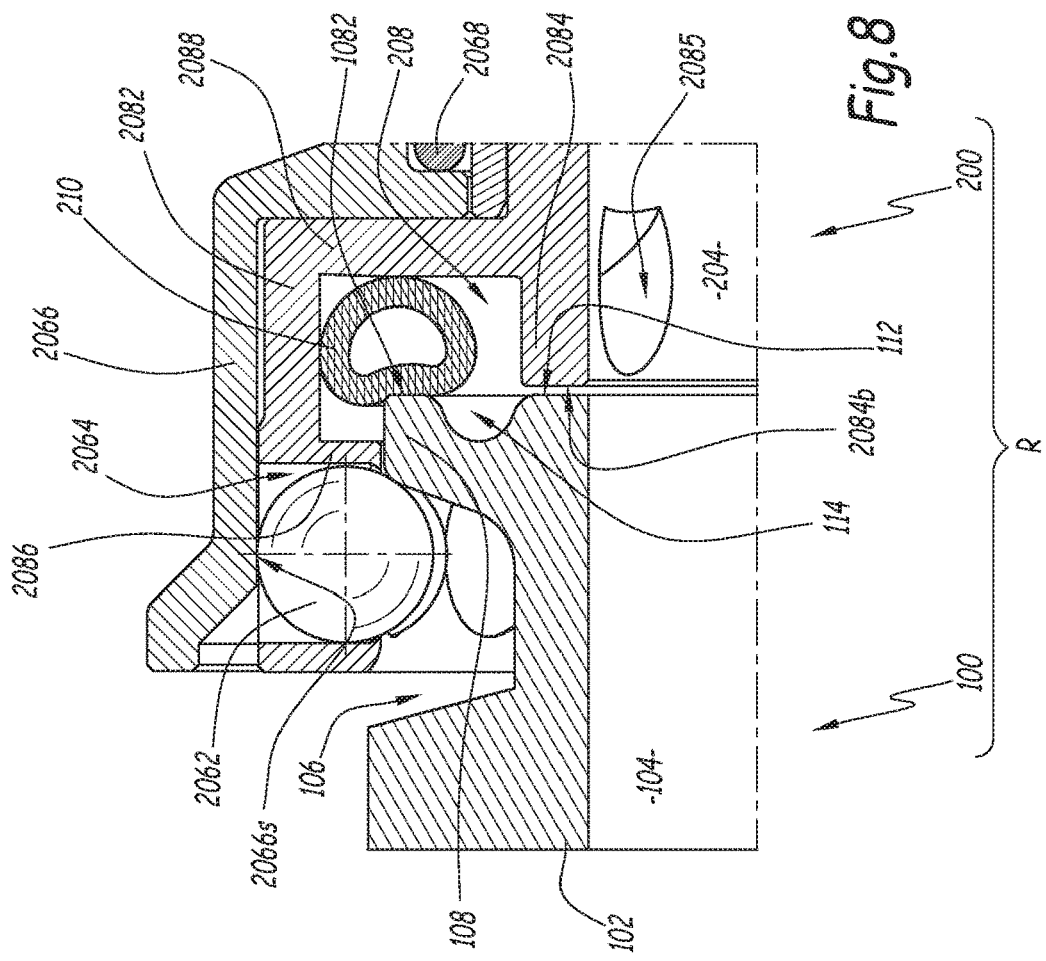
FIGS. 7 and 8 are detail views similar to FIGS. 5 and 6, respectively, for a coupling and a coupling element according to a third embodiment of the invention.
Figure 7:
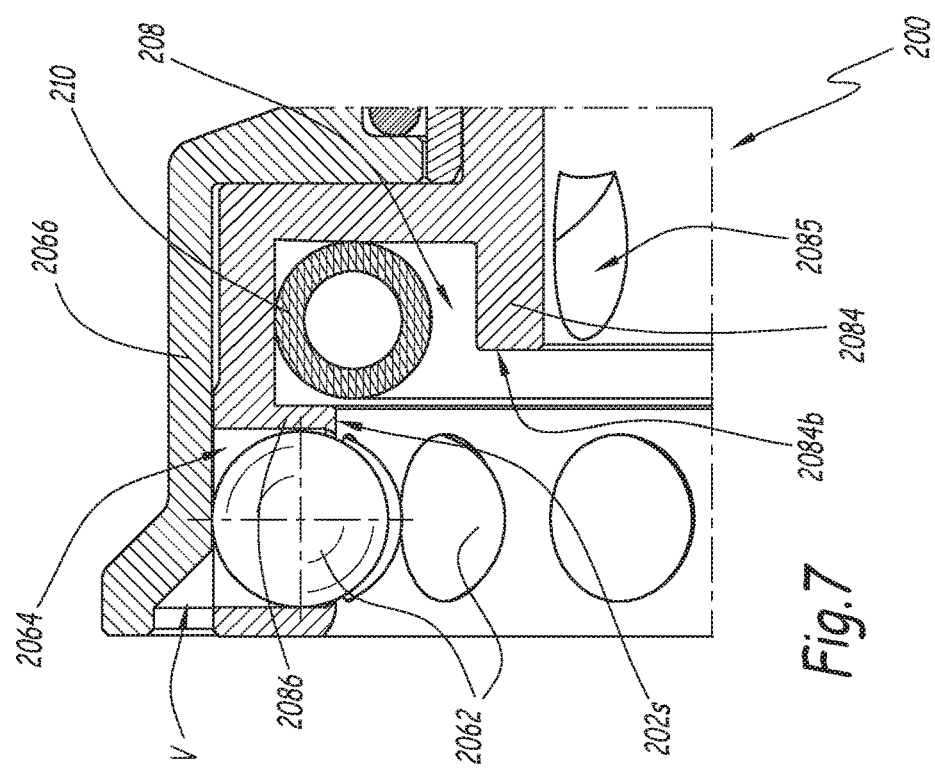

In the third embodiment shown in FIGS. 7 and 8, the seal 210 has a tubular section. In other words, this is a hollow seal with a closed contour that is deformed by crushing in the coupled configuration shown in FIG. 8. The contact between the flange 108 and the seal 210 in this case occurs over the entire radial width of the front edge 1082 of the flange radially positioned between the outer radial surface 1084 and the circumferential slot 114. This may be referred to as frontal contact. In this embodiment, the outer peripheral surface of the seal 210 is in contact both with the outer radial wall 2082 and the rear wall 2088 of the sealing chamber 208.

According to an alternative of the invention is not shown, the seal 210 of this embodiment is solid, i.e., has no central element, as long as a sufficiently flexible material is chosen for the seal 210 to allow a plastic deformation under the effect of the flange 108.

In the fourth embodiment shown in FIGS. 9 and 10, the sealing gasket 210 comprises an outer annular base 2107 as well as a blade 2108 that is frustoconical and convergent and that extends from the base 2107 toward the axis X2 toward the front of the female element 200. The base 2107 has a polygonal section with two planar surfaces, outer and rear, respectively, that simultaneously come into contact with the inner radial surface 2082s of the outer radial wall 2082 and the surface 2088s of the rear wall 2088 of the sealing chamber 208. The blade 2108 is configured to engage and be bent in the circumferential slot 114 of the body 102 in the coupled configuration of the coupling, which allows contact between the body 102 and the seal 210 over a relatively large surface. This further improve the obtained sealing.

Figure 12:
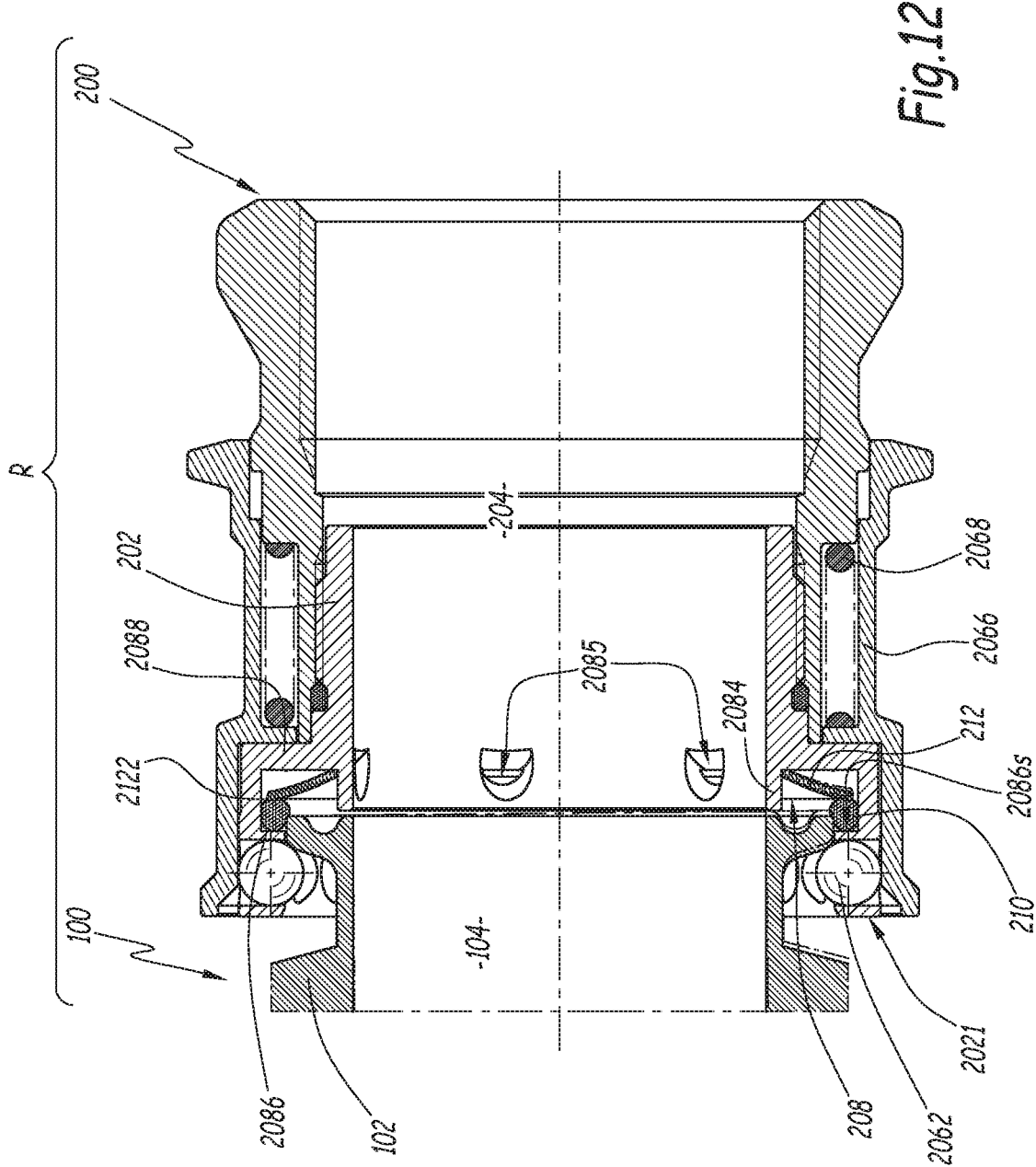
FIG. 12 is a sectional view similar to FIG. 4 for the coupling and the coupling element according to the fifth embodiment.

In the fifth embodiment shown in FIGS. 11 and 12, a solid O-ring seal 210 is housed in the sealing chamber 208 while being kept in position by an elastically deformable washer 212. This washer is frustoconical and comprises a rounded outer radial edge 2122 that is in contact with the O-ring 210 and an inner radial edge 2124 that bears the junction zone of the outer radial surface 2084s of the inner radial wall 2084 and the front surface 2088s of the rear wall 2088 of the sealing chamber 208.

Alternatively, the edge 2124 bears only against the rear surface 2088. The elastic washer 212 elastically pushes the O-ring 210 back toward the front wall 2086, bearing against the rear axial surface 2086s and against the inner radial surface 2082s of the sealing chamber 208.

When the male end-piece 100 is inserted in the body 202, the flange 108 comes into contact with the O-ring 210, which it tends to push toward the rear of the female element 200. The washer 212 then deforms relative to its original configuration shown in FIG. 11 and pushes the O-ring 200 back toward the front edge 2021 of the body 202 and toward the front wall 2086 of the sealing chamber 208, which results in firmly pressing the O-ring 210 against the outer peripheral surface of the flange 108, while the force necessary for fitting of the male end-piece 100 in the body 202 of the female element is controlled because the washer 212 adapts the space allotted to the seal 210 based on the geometry and position of the body 102 and therefore limits the compression of the material of the seal 210. In particular, in the case of a body 102 with a geometry close to the maximum dimensions of the allowances, the washer 212 deforms more than in the case of a body 102 with a geometry close to a minimum allowance, since the larger the outer diameter of the flange 108 is, the less the available space of the seal 210 near the front wall 2086 and between this flange and the outer radial wall 2082 is reduced.

According to one aspect that is not shown in FIGS. 11 and 12, the washer can be provided with through piercings making it possible to place the two compartments of the sealing chamber 208 defined on either side of this washer in fluid communication.

The washer 212 is preferably made from a polymer, for example PEEK.

In the coupled configuration, the incline of the end-piece 100 in the element 200 relative to the longitudinal axis X2 is limited by the abutment of the front face 112 and the front edge 2084b and modifies, at least locally, the bending of the washer 212, which keeps the seal 210 in contact with the body 102, but modifies the space allotted to the seal 210.

In an alternative that is not shown, the washer 212 acts on the seal with a different geometry, not toroid or hollow, for example the seal 210 of the described third embodiment.

Irrespective of the considered embodiment, the fact that the sealing chamber 208 is radially inwardly defined by the wall 2084 makes it possible to limit the pivoting movements of the male end-piece 100 in the body 202 in the coupled configuration of the coupling R, which guarantees maintenance of the sealing provided by the seal 210. This accounts for the fact that, given the geometry of a clamp end-piece, the flange 108 of which has a small axial length of about 3 mm, it is not possible to reduce the pivoting torque of this end-piece inside the body 202 solely by placing the outer radial surface of the flange 108 in contact with the inner radial surface 202s of the body 202. Furthermore, the through openings 2085 allow the fluid passing through the coupling R to reinforce the sealing by pressing the seal 210 both against the body 104 and against the walls 2082 and/or 2088 of the sealing chamber 208. These openings 2085 also allow the fluid circulating in the coupling to clean the sealing chamber 208, which makes it possible to space apart the maintenance operations of the seal 210 and cleaning of the sealing chamber 208 accordingly.

The fact that the chamber 208 is made in a single-piece part 2022 of the body 202, i.e., the fact that the walls 2082, 2084, 2086 and 2088 are a single piece, precisely guarantees the geometry of the sealing chamber 208, based on the nominal geometry of the end-piece 100, which limits the pivoting amplitude of the male end-piece 100 in the body 102.

Furthermore, since the front edge 2084b of the inner radial wall 2084 is offset backward from the rear axial surface 2086s of the front wall 2086, over the distance d1, the end-piece 100 can, during coupling, come into to tight contact with the seal 210 before abutting against the inner radial wall 2084.

Furthermore, part of the sealing gasket 210, i.e., the front blade 2104 in the first and second embodiments, the blade 2108 in the third embodiment and the inner radial portion of the seal 210 in the third and fifth embodiments, protrudes past the front wall 2086, radially, toward the axis XR, at a portion of the longitudinal axis positioned in front of the front edge 2084b. Irrespective of the geometry of the end-piece, within the provided allowance limits, the sealed contact between the seal 210 and the body 102 of the end-piece is optimized when the seal is able to follow the outer contour of the end-piece while limiting the compression of the material making up the seal 210. This is in particular the case for a seal that deforms by bending as in the first, second and fourth embodiments or that occupies a variable volume, as in the fifth embodiment.

Irrespective of the embodiment, cleaning the female coupling element 200 only requires disassembling the seal 210. It will also be noted that, when the seal 210 is symmetrical relative to a plane radial to the axis X2, the risks of incorrect assembly are limited.

One particular advantage of the first, second and fourth embodiments is that a seal 210 equipped with a blade 2104, 2106 or 2108 is relatively easy to remove from the sealing chamber 208.

Irrespective of the considered embodiment, locking members other than the balls 2062 can be provided in particular in the form of rotary or rotatable fingers or segments, the movement of which relative to the body 202 between their first blocking position and their second released position has at least one radial component, and which interact with the locking ring 2066.

According to another alternative, the front wall 2086 can be omitted with the inner radial surface 2082s at the same radial level as the inner radial surface 202s of the body 202 at the orifices 2064.

According to another alternative, the number of openings 2085 is not equal to four. It may in particular be greater than four.

According to another alternative, the ring is rotatable around the body 202 between its first position keeping the locking members in the blocking position and its second position, where it frees the locking members.

The material of the seal 210 can be different from an elastomer, for example a silicone.

The embodiments and alternatives considered above may be combined to generate new embodiments of the invention.

The invention claimed is:

1. A coupling element to be coupled with a complementary end-piece to join two fluid pipes, the coupling element comprising a body for partially receiving a complementary end-piece, this body being centered on a longitudinal axis extending between a front side oriented in a coupling direction and an oppositely oriented rear side and including a fluid circulation channel within the body and a sealing chamber that surrounds the channel and in which a sealing gasket able to cooperate with the complementary end-piece inserted in the body is housed, the sealing chamber being defined by an outer radial wall, a front wall, a rear wall and, radially inward relative to the longitudinal axis, an inner radial wall secured to the body, this coupling element comprising a locking mechanism that includes:
    at least one locking member radially movable in the body relative to the longitudinal axis, between a position blocking the complementary end-piece in the body and a position freeing the passage of the end-piece in the body, and
    a locking ring mounted around the body and movable relative thereto, between a first position keeping the locking members in their blocking position and a second position in which the locking ring does not oppose the movement of the locking members toward their released position,
wherein the inner radial wall is stationary relative to the front wall and to the rear wall in the uncoupled configuration and during coupling in a position in which a front edge of the inner radial wall, which forms a front end of the inner radial wall and is oriented toward the front side of the body, is offset backwardly away from the coupling direction, along the longitudinal axis, relative to a rear surface of the front wall and offset forwardly toward the coupling direction, along the longitudinal axis, relative to the rear wall.

2. The coupling element according to claim 1, wherein the inner radial wall of the sealing chamber is provided with at least one opening for placing the sealing chamber in communication with the fluid circulation channel within the body.

3. The coupling element according to claim 1, wherein the outer radial, rear and inner radial walls form a single piece.

4. The coupling element according to claim 3, wherein the front wall forms a single piece with the outer radial wall, the rear wall and the inner radial wall.

5. The coupling element according to claim 1, wherein, in the uncoupled configuration of the coupling element, the sealing gasket radially protrudes from the front wall, toward the longitudinal axis, at a portion of the longitudinal axis positioned in front of the front edge of the inner radial wall.

6. The coupling element according to claim 1, wherein housings of the locking members in the body are arranged in the front wall and wherein the locking members protrude radially from the front wall in their blocking position.

7. The coupling element according to claim 1, wherein the locking members are balls, and in that the locking ring defines an inner radial covering surface of the balls in their blocking position when the locking ring is in its first position and a partial receiving space of the balls in the released position when the locking ring is in its second position, this partial receiving space in turn being outwardly defined, radially to the longitudinal axis, by a portion of the locking ring.

8. The coupling element according to claim 1, wherein the sealing gasket comprises an outer base bearing against the outer radial wall and/or the rear wall of the sealing chamber and at least one blade which, in the uncoupled configuration of the coupling element, extends from the base and toward the longitudinal axis.

9. The coupling element according to claim 8, wherein in the uncoupled configuration of the coupling element, the blade extends toward the longitudinal axis, from a front portion of the base and in an opposite direction oriented toward a rear of the coupling element.

10. The coupling element according to claim 9, wherein, in the uncoupled configuration of the coupling element, an angle, defined between the blade and the base, is comprised between 65° and 80°.

11. The coupling element according to claim 1, wherein, in the uncoupled configuration of the coupling element, the sealing gasket is symmetrical relative to a plane radial to the longitudinal axis.

12. The coupling element according to claim 1, wherein, in the uncoupled configuration of the coupling element, the sealing gasket has, in a plane radial to the longitudinal axis, a globally U-shaped section open toward the longitudinal axis.

13. The coupling element according to claim 1, wherein an elastic washer is positioned, bearing against the sealing gasket, in the sealing chamber.

14. The coupling element according to claim 13, wherein the washer bears on the rear wall of the sealing chamber and pushes the sealing gasket back toward the front wall defining the sealing chamber.

15. A coupling comprising a coupling element, and a complementary end-piece, the complementary end-piece being provided with
    a central fluid passage channel,
    an outer radial cavity for receiving at least one locking member in the coupled configuration of the coupling, the receiving cavity being defined in front by a flange,
    a front face, and
    a circumferential slot that borders the front face, the front face being positioned radially between the central channel of the complementary end-piece and the circumferential slot,
wherein the coupling element is according to claim 1 and wherein, in the coupled configuration of the coupling, the inner wall of the sealing chamber is aligned along the longitudinal axis of the coupling element with the front face of the complementary end-piece.

16. A coupling according to claim 15, wherein the complementary end-piece comes into contact with the sealing gasket during coupling before abutting the front end of the inner radial wall.

* * * * *